US008001551B2

(12) United States Patent
Le Roy et al.

(10) Patent No.: US 8,001,551 B2
(45) Date of Patent: Aug. 16, 2011

(54) PROVIDING LOCALIZED RESOURCES FOR CLIENT-SIDE SCRIPT EXECUTION

(75) Inventors: Bertrand Claude Le Roy, Bellevue, WA (US); Simon Calvert, Issaquah, WA (US); Nikhil Kothari, Sammamish, WA (US); Eilon J. Lipton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/739,570

(22) Filed: Apr. 24, 2007

(65) Prior Publication Data

US 2008/0271045 A1 Oct. 30, 2008

(51) Int. Cl.
*G06F 3/00* (2006.01)
*G06F 15/73* (2006.01)
*G06F 15/16* (2006.01)
*G06F 9/44* (2006.01)

(52) U.S. Cl. ........ 719/311; 719/318; 709/224; 709/230; 717/115

(58) Field of Classification Search .................. None
See application file for complete search history.

(56) References Cited

U.S. PATENT DOCUMENTS

| | | | |
|---|---|---|---|
| 5,761,650 A | 6/1998 | Munsil | |
| 5,963,925 A | 10/1999 | Kolling | |
| 6,066,242 A | 5/2000 | Poole | |
| 6,216,121 B1 | 4/2001 | Klassen | |
| 6,333,999 B1 | 12/2001 | Brownsmith | |
| 6,405,221 B1 | 6/2002 | Levine | |
| 6,484,150 B1 | 11/2002 | Blinn | |
| 6,490,547 B1 | 12/2002 | Atkin et al. | |
| 6,492,995 B1 | 12/2002 | Atkin et al. | |
| 6,557,005 B1 | 4/2003 | Burget | |
| 6,691,176 B1 * | 2/2004 | Narin et al. | 719/318 |
| 6,832,351 B1 | 12/2004 | Batres | |
| 6,865,716 B1 | 3/2005 | Thurston | |
| 6,993,568 B1 | 1/2006 | Hauduc et al. | |
| 2003/0135501 A1 | 7/2003 | Frerebeau et al. | |
| 2004/0064469 A1 * | 4/2004 | Takahashi et al. | 707/100 |

(Continued)

OTHER PUBLICATIONS

ASP.net AJAX, "Localizing Resources for Component Libraries Overview", 2005-2006 Microsoft Corporation, 11 pages, http://ajax.asp,net/docs/overview/LocalizingResources.aspx.
David, Jean-Luc, Builder.com, "Detect foreign language support using JavaScript", Sep. 11, 2003, 5 pages, http://builder.com.com/5100-6371-5069931.html.

(Continued)

*Primary Examiner* — Andy Ho
*Assistant Examiner* — Tuan Dao
(74) *Attorney, Agent, or Firm* — Workman Nydegger

(57) ABSTRACT

The present invention extends to methods, systems, and computer program products for providing localized resources for client-side script execution. Embodiments of the invention facilitate providing culturally localized resources for executing client-side scripts at Web browser. In some embodiments, client-side script reference tags refer to a script handler at the Web server (instead of an actual script). The script handler can a return localized resource sets for use with client-side scripts (that include calls to external resources). Accordingly, execution of client-side scripts can be localized in accordance with resources contain in the localized resource set. In other embodiments, a script manager using a generic script reference to identifying an appropriate localized instance of a script. Client-side script reference tags refer to the appropriate localized instance of the script. Accordingly, execution of a Web page can be localized in accordance with the localizations contained in the localized instance of the script.

19 Claims, 4 Drawing Sheets

U.S. PATENT DOCUMENTS

| | | | |
|---|---|---|---|
| 2004/0261054 A1 | 12/2004 | Colling | |
| 2005/0102608 A1* | 5/2005 | Batres | 715/505 |
| 2006/0212575 A1 | 9/2006 | Lin et al. | |
| 2006/0248166 A1 | 11/2006 | Milosevic et al. | |
| 2007/0094073 A1* | 4/2007 | Dhawan et al. | 705/14 |
| 2007/0150610 A1* | 6/2007 | Vassilev et al. | 709/230 |
| 2007/0271501 A1* | 11/2007 | Vasilik | 715/511 |
| 2008/0104224 A1* | 5/2008 | Litofsky et al. | 709/224 |
| 2008/0127045 A1* | 5/2008 | Pratt et al. | 717/104 |

OTHER PUBLICATIONS

IBM, "Globalize your On Demand Business", 2 pages, http://www-306.ibm.com/software/globalization/topics/javascript/localization.jsp, Feb. 20, 2007.

"A Tacklebox Approach", 2006, 4 pages, http://www.barracudamvc.org/Barracuda/docs/architecture/tacklebox.html.

U.S. Appl. No. 11/009,656, Jan. 12, 2007, Office Action.

U.S. Appl. No. 11/009,656, Apr. 6, 2007, Notice of Allowance.

* cited by examiner

PROVIDING LOCALIZED RESOURCES FOR CLIENT-SIDE SCRIPT EXECUTION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaSript, VBScript, ASP, PHP, Perl, or ASP.Net. A web server can maintain pages that include both server-side and client-side scripts.

Server-side scripts can be used to obtain data accessible to a Web server for inclusion in a corresponding Web page or to perform other actions related to returning the corresponding Web page. When a Web server receives a Web browser request for a Web page that includes server-side script, the Web server passes the server-side script off to an appropriate script engine. The script engine processes the script to perform actions on relevant data and potentially returns portions of the relevant data, for example, represented in corresponding HTML directives. Any portions of relevant data, for example, the representative HTML directives, are then injected into a Web page for return to the Web browser (along with any client-side scripts).

For example, if a server-side script is configured to query and return 10 database rows, the script engine returns the 10 database rows in a HTML format to the Web server. The Web server then injects the HTML representing the 10 database rows into any other HTML directives and client-side scripts in the Web page. After all server-side scripts are processed, the resulting HTML from processing the server side-scripts, other HTML, any inline client-side scripts, and any script references to client-side scripts are sent back to the Web browser.

Client-side scripts are useful for implementing additional behaviors to supplement Web browser functionality, such as, for example, to provide richer behavior and user interaction in the Web browser without any server interaction. Client-side scripts that request data or additional scripts from the Web server or from other Web servers are also possible. Client-side scripts can be embedded in a Web page or can be included in a separate file. When a client-side script is included in an external file, a Web page can include a script reference (e.g., <script type="text/javascript" src="hello.js"></script>) referencing the script or such a reference can be subsequently injected into the Web page. Client-side scripts and script references can be included in-line in a Web page that is sent to a Web browser. Thus, as the Web browser processes the Web page it can encounter embedded client-side scripts as well as script references to client-side scripts.

For a Web browser to execute a script, the Web browser must have an appropriate reference identifying the script. Thus, in response to a Web browser request for a Web page, a Web server typically sends down a list of client-side script references to the Web browser. If the Web browser already has access to the referenced script locally (e.g., cached from previously rendering the same Web page), the Web browser can execute the script. If the Web browser does not have access to the referenced script locally, it can download the script from the referenced location (e.g., at the Web server) and then execute the script.

Due to the ubiquity of computers and computer networks, especially the Internet, Web pages developed in one culture are typically easily accessible to users in other cultures. However, Web page developers often do not account for potential cross-cultural access to developed Web pages. For example, a Web page developer in France may develop and utilize Web based resources for client-side scripts in the French language. However, the Web developer may not account for access from other countries where a low percentage of the population that understands French. Thus, when a user in a non-French speaking cultural accesses the Web page, various client-side scripts can be executed using the French language resources, which are not comprehendible to the user.

To attempt to account for cross-cultural Web page access, a Web page developer may develop various culturally localized versions of client-side scripts ans server-side scripts. The Web page developer may also use third-party components, such as, for example, a calendar control. The developer of the third-party component can develop the third-party component with supporting client-side scripts that account for cultural variations. The Web page developer may then activate cultural handling when developing the page with the third-party component.

However, it is typically difficult for a Web server to utilize a model where client-side scripts are dynamically assembled for cultural variations, instead of having a script file per culture, which duplicates client-side script code Thus, the Web page developer can simply include client-side script references for all culturally localized versions of each script in a returned Web page and let the Web browser decide which reference to use. However this is not very efficient, as it would require sending script files representing all cultural values to the Web browser and then somehow indicating to the Web browser or having the Web browser somehow detect a culture to use.

BRIEF SUMMARY

The present invention extends to methods, systems, and computer program products for providing localized resources for client-side script execution. In some embodiments, a Web server includes a script handler for providing client-side scripts and corresponding appropriately localized resources to a Web browser. The Web server receives a Web page request from the Web browser. The Web page request indicates a user-interface culture of the Web browser. The Web server accesses a server-side page that corresponds to the Web page. The Web server executes a script manager that is referenced in the server-side page.

The script manager accesses a client-side script reference included in the server-side page. The client-side script reference refers to a client-side script that is to be executed at the Web browser and that includes localization calls to external resources. The script manager formulates an adapted client-side script reference to return to the Web browser. The adapted client-side script reference refers to the script handler and includes a query portion that identifies at least the referenced client-side script and the user-interface culture of the Web browser (or other user-interface culture). The Web server returns the adapted client-side script reference to the Web browser in a Web page responsive to the Web page request.

Subsequently, the Web server receives the adapted client-side script reference from the Web browser in response to the Web browser rendering the Web page. Reception of the adapted client-side script reference is a request for the referenced client-side script. The Web server dispatches the query portion of the adapted client-side script reference to the script handler.

The script handler identifies an appropriately localized resource set to use along with the referenced client-side script at the Web server based at least in part on the user-interface culture of the Web browser (or other user-interface culture). The script handler creates a resource set that can be used by the client-side script. The script handler returns the referenced client-side script along with the resource set to the Web browser in a single request. Accordingly, execution of the client-side script at the Web browser can be localized in accordance with resources contained in the resource set.

In other embodiments, a Web server receives a Web page request from the Web browser. The Web page request indicates a user-interface culture of the Web browser. The Web server accesses a server-side page that corresponds to the Web page and executes a script manager that is included in the server-side page.

The script manager accesses a generic client-side script reference included in the server-side page. The generic client-side script reference refers to a client-side script that is to be executed at the Web browser. The script manager uses the generic client-side script reference and the user-interface culture of the Web browser to identify an appropriate client-side script reference to return to the Web browser. The appropriate client-side script reference refers to a culturally localized instance of the referenced script.

The Web browser returns the appropriate client-side script reference to the Web browser in a Web page responsive to the Web page request. Subsequently, the Web browser receives the appropriate client-side script reference from the Web browser in response to the Web browser rendering the Web page. Reception of the appropriate client-side script reference is a request for the culturally localized instance of the referenced client-side script. The Web browser returns the culturally localized variation of the referenced client-side script to the Web browser. Accordingly, execution of the Web page at the Web browser can be localized in accordance with the localizations contained in culturally localized variation of the referenced client-side script.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
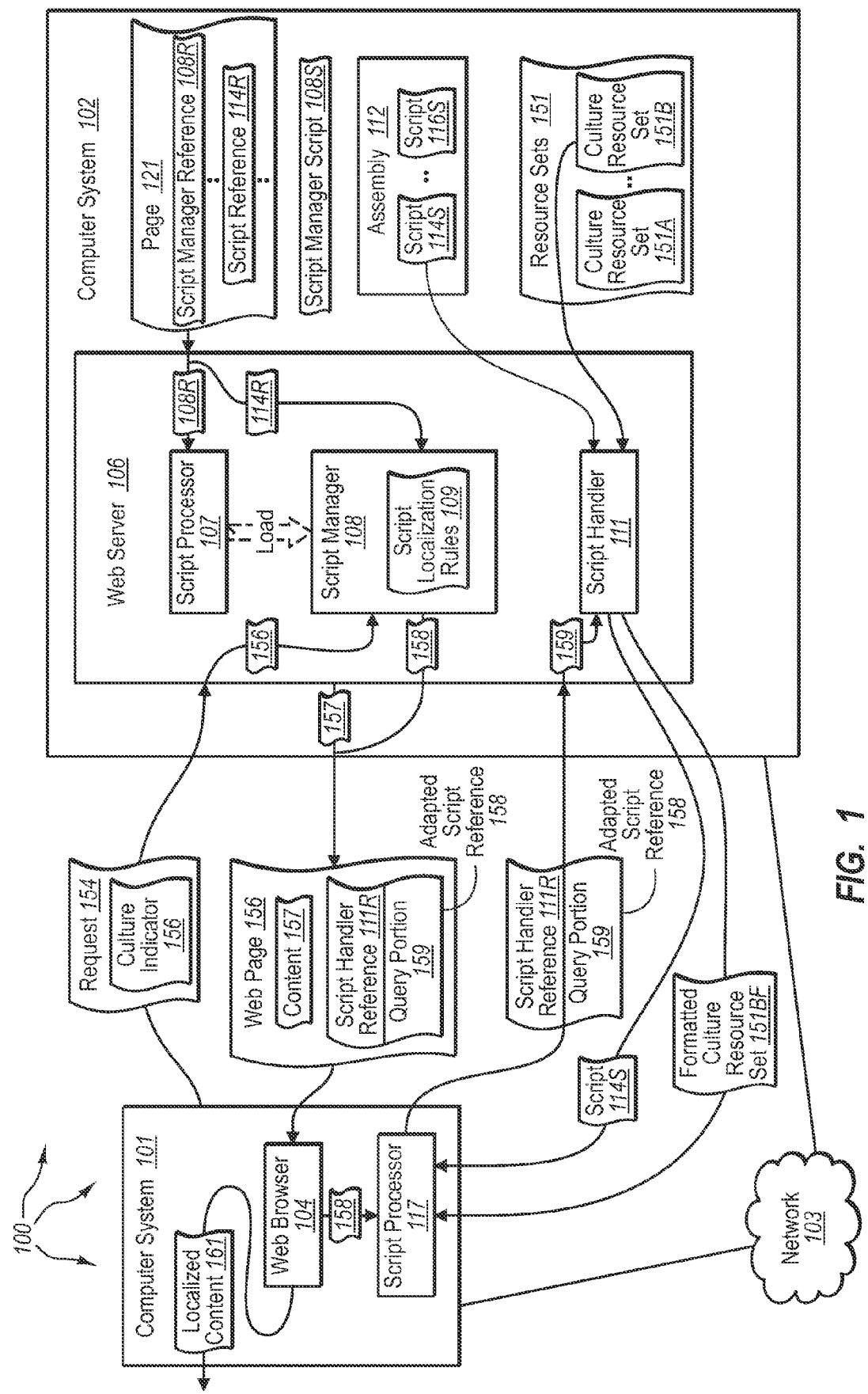
FIG. 1 illustrates an example computer architecture that facilitates providing localized resources for client-side script execution.

The present invention extends to methods, systems, and computer program products for providing localized resources for client-side script execution. In some embodiments, a Web server includes a script handler for providing client-side scripts and corresponding appropriately localized resources to a Web browser. The Web server receives a Web page request from the Web browser. The Web page request indicates a user-interface culture of the Web browser. The Web server accesses a server-side page that corresponds to the Web page. Thus, a developer can (at the server) detect a user-interface culture and manipulate it before a script reference is rendered to the Web browser.

The Web server executes a script manager that is referenced in the server-side page. The script manager accesses a client-side script reference included in the server-side page. The client-side script reference refers to a client-side script that is to be executed at the Web browser and that includes localization calls to external resources. The script manager formulates an adapted client-side script reference to return to the Web browser. The adapted client-side script reference refers to the script handler and includes a query portion that identifies at least the referenced client-side script and the user-interface culture of the Web browser (or other user-interface culture). The Web server returns the adapted client-side script reference to the Web browser in a Web page responsive to the Web page request.

Subsequently, the Web server receives the adapted client-side script reference from the Web browser in response to the Web browser rendering the Web page. Reception of the adapted client-side script reference is a request for the referenced client-side script. The Web server dispatches the query portion of the adapted client-side script reference to the script handler.

The script handler identifies an appropriately localized resource set to use along with the referenced client-side script at the Web server based at least in part on the user-interface culture of the Web browser (or other user-interface culture). The script handler creates a resource set that can be used by the client-side script. The script handler returns the referenced client-side script along with the resource set to the Web browser in a single request. Accordingly, execution of the client-side script at the Web browser can be localized in accordance with resources contained in the resource set.

In other embodiments, a Web server receives a Web page request from the Web browser. The Web page request indicates a user-interface culture of the Web browser. The Web server accesses a server-side page that corresponds to the Web page and executes a script manager that is included in the server-side page.

The script manager accesses a generic client-side script reference included in the server-side page. The generic client-side script reference refers to a client-side script that is to be executed at the Web browser. The script manager uses the generic client-side script reference and the user-interface culture of the Web browser to identify an appropriate client-side script reference to return to the Web browser. The appropriate client-side script reference refers to a culturally localized instance of the referenced script.

The Web browser returns the appropriate client-side script reference to the Web browser in a Web page responsive to the Web page request. Subsequently, the Web browser receives the appropriate client-side script reference from the Web browser in response to the Web browser rendering the Web page. Reception of the appropriate client-side script reference is a request for the culturally localized instance of the referenced client-side script. The Web browser returns the culturally localized variation of the referenced client-side script to the Web browser. Accordingly, execution of the Web page at the Web browser can be localized in accordance with the localizations contained in culturally localized variation of the referenced client-side script.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable-type) computer-readable storage media, such as, RAM, ROM, EEPROM, CD-ROM or other optical disk storage, magnetic disk storage or other magnetic storage devices. Computer-readable storage media, however, should not be construed as encompassing signals.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates identifying appropriate client-side script references. As depicted, computer architecture 100 includes computer system 101, computer system 102, and network 103. Computer systems 101 and 102 include various computer system components including Web browser 104 and Web server 106 respectively. Each of the various components can be connected to network 103, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange HTTP requests and responses and Simple Object Access Protocol ("SOAP") envelopes containing Web service related data.

Web browser 104 can be configured to request Web-based content from Web servers, such as, for example, Web server 106, accessible via network 103. Web-based content can include text data, image data, audio/video data, executable code (e.g., scripts), etc. When executable code is received, such as, for example, a portion of Web-based application, the executable code can be executed by a script processor (e.g., script processor 117) accessible to Web browser 104.

Web server 106 is configured to receive Web browser requests, and return requested content back to a request Web browser. When Web server 106 receives a request, it can identify a server-side page that corresponds to the request (e.g., through dispatching the request to an appropriate process based on a URL contained in the request). Web server 106 can then load the identified server-side page.

If any server-side script references are included in the server-side page, Web server 106 can send the referenced server-side scripts (e.g., ASP.Net instructions) to script processor 107 for processing. Script processor 107 processes the server-side scripts and returns any corresponding results back to Web browser 106. Web browser 106 can then include the results (potentially after additional formatting), along with other content and any client-side script references, in a Web page. Web server 106 can then return the Web page to the requesting Web browser.

Thus, for example, it may be that Web browser 104 sends requests 154 (an HTTP get) to Web server 106 (by utilizing an appropriate URL for Web server 106). Web server 106 can process request 154 and generate/obtain corresponding content. The corresponding content and any client-side script references can be returned to Web browser 104 in Web page 156 (e.g., contained in an HTTP message). Client-side script references can reference scripts stored in various different locations at computer system 102, such as, for example, in a directory structure of a storage device, in assembly 112 (e.g., a dynamic link library ("DLL")), etc. Client-side script references can also reference scripts stored at other computer system, such as, for example, at other Web servers connected to network 103.

Server-side pages stored at computer system 102 can include server-side scripts that can be executed at Web server 106 to identify appropriate client-side script references to return to a Web browser. For example, page 121 includes script manager reference 108R referencing script manager script 108S. Script processor 107 can execute script manager script 108S to load script manager 108.

Generally, script manager 108 is configured to receive a user-interface culture indication (e.g., culture indicator 156) and a client-side script reference (e.g., script reference 114R). A user-interface culture indication can be received from a Web browser or other client-side module. From the user-interface culture indication and client-side script reference, script manager 108 can formulate an adapted client-side script reference (e.g., a URL) referring to script handler 111. The adapted client-side script reference can include a query portion that identifies at least the referenced client-side script and the user-interface culture indication. Thus, instead of returning a reference to an actual client-side script, a Web browser is instead returned a reference to script handler 111. The reference includes a portion of data (the query portion) that can be used by script handler 111 to identify a referenced script and correspondingly appropriate culture resource set to return to a Web browser.

Optionally, script manager 108 can encrypt the adapted client-side script reference.

Script localization rules 109 can include logic and policies for constructing an appropriate query portion to return to a Web browser. Accordingly, script manager 108 can apply script localization rules 109 to client-side script references included in a server-side page to construct appropriate query portions for adapted client-side script references based on a user-interface culture indication.

Web browser 104 can receive an adapted client-side script reference (e.g., a URL) and, during execution of a Web page, pass the adapted client-side script reference to a script processor 117. In response, the script processor 117 can use the adapted client-side script reference to request a referenced script and correspondingly appropriate culture resource set.

When Web server 106 receives adapted client-side script reference, it can dispatch the query portion of the adapted client-side script reference to script handler 111. When appropriate, script handler 111 can decrypt the query portion. Script handler 111 can access the referenced script and determine an appropriate user-interface culture resource set to return along with the referenced. Determining an appropriate user-interface culture resource can include identifying a user-interface culture resource set that best matches the user-interface culture indication or as previously determined.

A user-interface culture indication can indicate a culture using a combination of language and country as defined in "RFC 1766—Tags for the Identification of Languages", March 1995. Languages can be indicated according to language codes in ISO 639-1 (Language Codes), ISO 639-2 (codes for the representation of names of languages), or W3C Internationalization (I18n) Activity. Countries can be indicated according to country codes in ISO 3166 (country codes). For example, a user-interface culture indication can indicate en-US (English in the United States). Other combinations of languages, such as, for example, Chinese, Japanese, Korean, German, Russian, etc., and countries, such as, for example, China, Japan, Korea, Germany, Russia, etc., are also possible. Determining a language and country combination can include referring to the user-interface culture of a Web browser or other module or executing a configurable algorithm that determines a language and country combination.

Thus, if a user-interface culture indication indicates en-US and there is an en-US culture resource set, the en-US culture resource set can be returned along with the referenced script. Script handler 111 can also include fallback logic to identify an appropriate culture resource set, when a best match isn't available. For example, if a user-interface culture indication indicates fr-CA (French in Canada) and there is not an fr-CA culture resource set available, script handler 111 can invoke the fallback logic. The fallback logic can identify a best culture resource set from available culture resource sets. For example, if an en-US, an en-Aus (English in Australia), and an fr-FR (French in France) culture resource sets are available, script handler 111 can identify the fr-FR culture resource set as appropriate (since it is at least the correct language). If fallback logic does not identify an appropriate culture resource set, a Web server or Web page culture resource set default can be identified.

Script handler 111 can format an identified user-interface culture resource set for compatibility with localization calls (i.e., calls that use localized resources). For example, script handle 111 can use a known model (e.g., NET) to obtain an in memory resource set that originates from looking at compiled versions of .resx files embedded in assembles. The .resx file format includes name/value pairs wrapped in XML instructions, which describe string and/or object values. The .resx file model is used for server-side storage of localized values for a specified user-interface culture.

Script processor 117 can receive a script and corresponding formatted culture resource set. Script processor 117 can load the script such that calls for external resources are directed to the formatted culture resource set. Accordingly, the script can provided localized output (e.g., exception messages) at Web browser 104.

Figure 2:
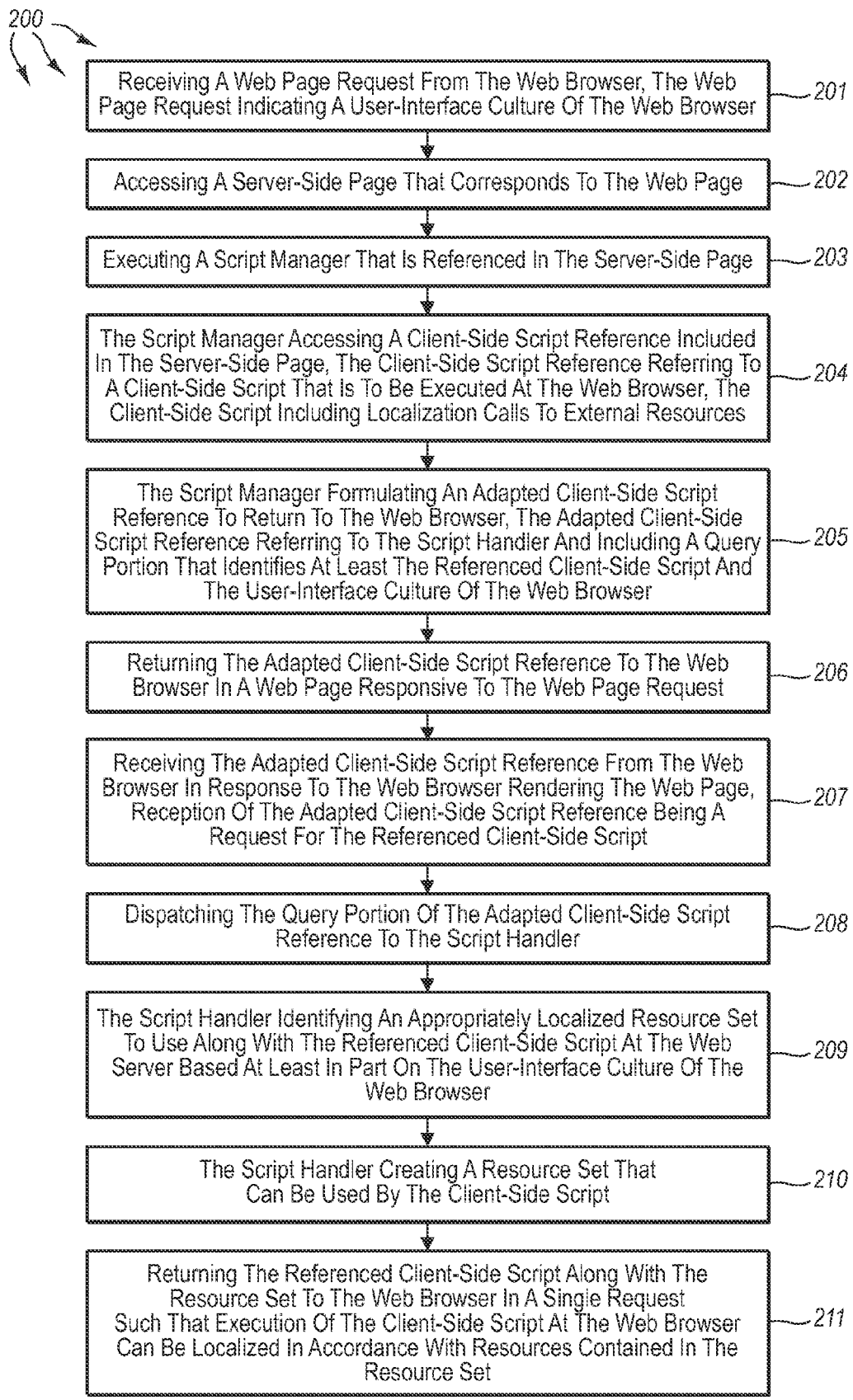
FIG. 2 illustrates a flow chart of an example method for providing localized resources for client-side script execution.

FIG. 2 illustrates a flow chart of an example method 200 or providing localized resources for client-side script execution. The method 200 will be described with respect to the components and data depicted in computer architecture 100.

Method 200 includes an act of receiving a Web page request from the Web browser, the Web page request indicating a user-interface culture of the Web browser (act 201). For example, Web server 106 can receive request 154 (e.g., an HTTP GET, POST, etc.), including culture indicator 156, from Web browser 104. Culture indicator 156 indicates the user-interface culture of Web browser 104. Method 200 includes an act of accessing a server side page that corresponds to the Web page (act 202). For example, Web server 106 can access page 121 (e.g., an ASP .Net page).

Method 200 includes an act of executing a script manager that is referenced in the server-side page (act 203). For example, Web server 106 can identify script manager reference 108R as a reference to a server-side script. In response, Web server 106 can transfer script reference manager reference 108R to script processor 107. Script processor 107 can use script manager reference 108R to locate script manager script 108S (e.g., stored somewhere at computer system 102). Script processor 107 executes script manager script 108S to load an instance of script manager 108.

Method 200 includes an act of the script manager accessing a client-side script reference included in the server-side page, the client-side script reference referring to a client-side script that is to be executed at the Web browser, the client-side script including localization calls to external resources (act 204). For example, script manager 108 can access script reference 114R form page 121. Script reference 114R refers to script 114S that is to be executed at Web browser 104. Script 114S can be in a dynamic language, such as, for example, JavaScript and can include calls to external resources, such as, for example, external strings and external objects.

Method 200 includes an act of the script manager formulating an adapted client-side script reference to return to the Web browser (act 205). The adapted client-side script reference refers to the script handler and includes a query portion that identifies at least the referenced client-side script and the user-interface culture of the Web browser. For example, script manager 108 can formulate adapted script reference 158 to return to Web browser 104. As depicted, adapted script reference 158 includes script handler reference 111R and query portion 159. Script handler reference 111R is a URL path to script handler 111. Query portion 159 includes at least a reference to script 114S and culture indicator 156 and can also include other data to assist script handler 111 in selecting an appropriate culture resource set. Script manager 108 can apply script localization rules 109 based on script reference 114R and culture indicator 156 to formulate adapted script reference 158.

When appropriate, script manager 108 can encrypt query portion 159. Thus, adapted script reference may be of the format http//:[URL to Script Handler 111]?[encrypted query portion] and included in a script tag, such as, for example, <script type="text/javascript" src="http//:[URL to Script Handler 111]?[encrypted query portion]"></script>)

within Web page 156.

Method 200 includes an act of returning the adapted client-side script reference to the Web browser in a Web page responsive to the Web page request (act 206). For example, Web server 106 can return Web page 156 to Web browser 104. Web page 156 can include content 157 (e.g., any content accessed and/or generated at Web server 106) along with adapted script reference 158.

During rendering of Web page 156, Web browser 104 can encounter adapted script reference 158. Web browser 104 can pass adapted script reference 158 to script processor 117. Since the adapted script reference is include in a script tag, script processor 117 attempts to obtain a script from the location referenced by adapted script reference 158. For example, script processor 117 can submit adapted script reference 158 back to Web server 106.

Method 200 includes an act of receiving the adapted client-side script reference from the Web browser in response to the Web browser rendering the Web page, reception of the adapted client-side script reference being a request for the referenced client-side script (act 207). For example, Web server 106 can receive adapted script reference 158 from Web browser 104 in response to Web browser 104 rendering Web page 156. Reception of adapted script reference 158 is a request for a referenced client-side script.

Method 200 includes an act of dispatching the query portion of the adapted client-side script reference to the script handler (act 208). For example, based on script handler reference 111R, Web server 106 can dispatch (potentially encrypted) query portion 159 to script handler 111. When appropriate, script handler 111 can decrypt query portion 159.

Method 200 includes an act of the script handler identifying an appropriately localized resource set to use along with the referenced client-side script at the Web server based at least in part on the user-interface culture of the Web browser (act 209). For example, upon accessing culture indicator 156 and script reference 114R from query portion 159, script handler 111 can access resource sets 151, including culture resource sets 151A through 151B. Script handler 111 can identify an appropriate culture resource set 151B based at least in part on culture indicator 156. For example, it may be that culture indicator 156 indicates the user-interface culture of Web browser 104 is en-US and that culture resource set 151B includes en-US resources. When appropriate, script handler can apply fallback logic to identify an appropriately localized resource set.

Method 200 includes an act of the script handler creates a localized that can be used by the client-side script (act 210). For example, script handler 111 can create culture resource set 151BF into from culture resource set 151B (e.g., a .resx file) for compatibility with external resource calls of script 114S.

Method 200 includes an act of returning the referenced client-side script along with the resource set to the Web browser in a single request (act 211). Accordingly, execution of the client-side script at the Web browser can be localized in accordance with resources contained in the resource set. For example, script handler 111 can return script 114S and formatted culture resource set 151BF to script processor 107. Accordingly, script processor 117 can localize the execution script 114S in accordance with the resources contained in formatted culture resource set 151BF. For example, execution of script 114S can produce localized content 161.

Figure 3:
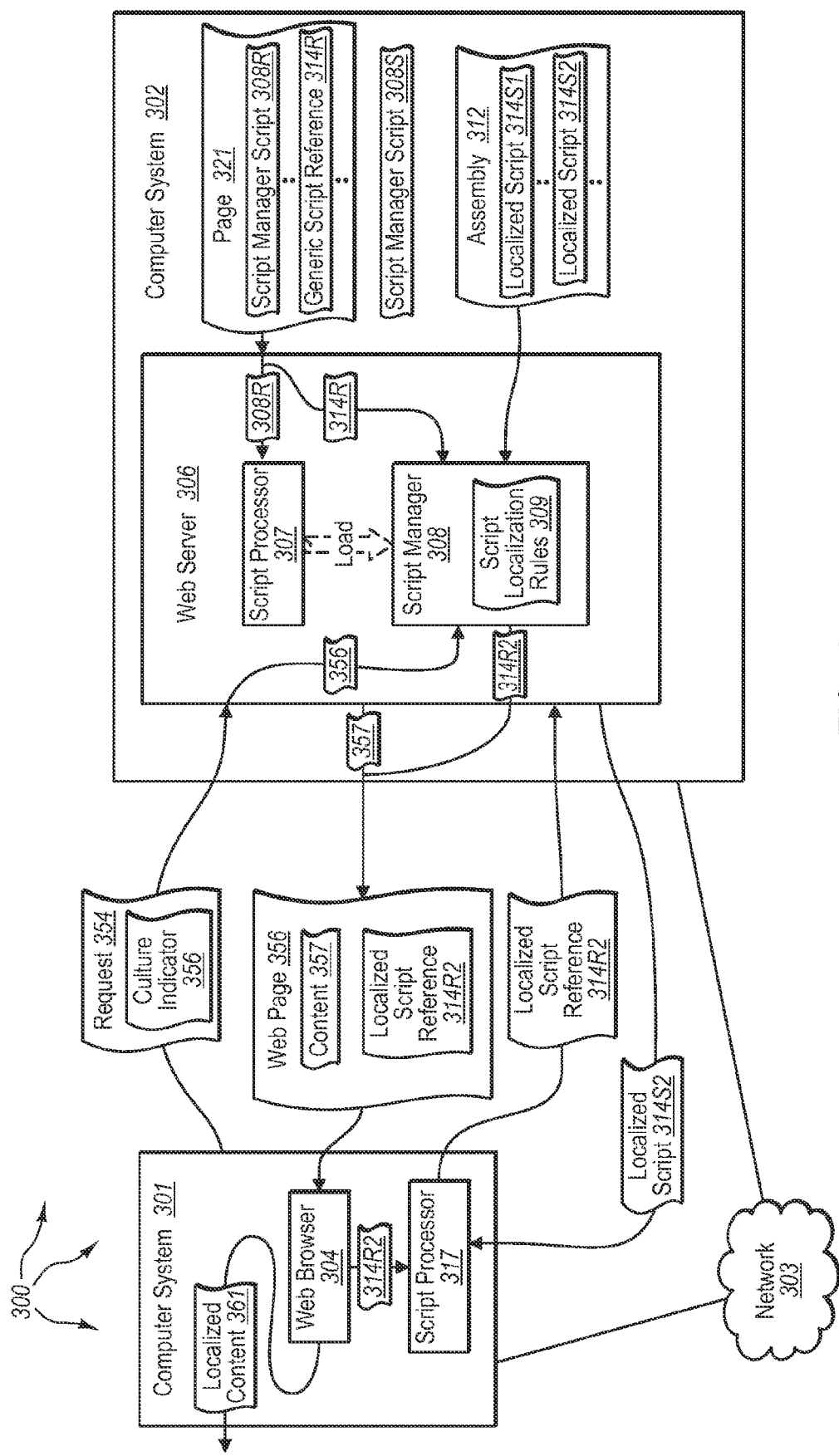
FIG. 3 illustrates another example computer architecture that facilitates providing localized resources for client-side script execution.

FIG. 3 illustrates another example computer architecture 300 that facilitates providing localized resources for client-side script execution. Generally, the components depicted in computer architecture 300 are similarly configured to correspondingly named components depicted in computer architecture 100. That is, Web browser 304 is similarly configured to Web browser 104, Web server 306 is similarly configured to Web server 304, and script processors 307 and 317 are similarly configured to script processors 107 and 117 respectively.

Assembly 312 includes various instances of script 314S that have been localized for different user-interface cultures. For example, it may be that localized script 314S1 is localized for fr-CA culture, localized script 314S2 is localized for en-BG (English in Great Britain), another script can be localized for cn-CN (Chinese in China), etc. Server-side pages, such as, for example, page 321 can include generic script references. Script manger 308 can used a generic script reference in combination with a user-interface culture indicator to identify a reference for an appropriately localized script.

In other embodiments, script manager 108 is instructed that a script reference to a file-based script has localized values. Script manager 108 can use the instructions to create a reference to the file-based script that includes an appropriate user-interface culture indicator. Alternately, a Web page developer can override script references are for assembly-based scripts causing references to point to some location on disk. Script manager 108 can use an assembly-based model to determine an appropriate user-interface culture (i.e., it can work through the assemblies to get the right user-interface culture) and then use the appropriate user-interface culture to build file-based script references.

Script localization rules 309 can include logic and policies for identifying an appropriate client-side reference to a localized instance of a script based on a received generic script reference and a user-interface culture indicator. Accordingly, script manager 308 can apply script localization rules 309 to a generic script reference and user-interface culture indicator to identify script reference for a localized instance of script.

Script localization rule logic can include algorithms for identifying and enumerating client-side script references for a plurality of differently localized instances of a script. As such, script selection rules 309 can be used to enumerate client-side script references to a plurality of (and potentially all) differently localized instances of a script in response to receiving a generic script reference. For example, script selection rules 309 can automatically identify and enumerate localized scripts 314S1, 314S2, etc in response to receiving generic script reference 314R.

Script localization rule policies can be made to determine whether a client-side script reference for a specified localized instance of a script is to be returned to a Web browser. For example, culture indicator 356 can indicate that Web browser 304 is operating in an en-US culture. Thus, script selection rule policies can determine that en-US instances of scripts are preferred. Accordingly, a client-side script reference to an en-US instance a script can be provided to Web browser 104. Script localization rule policies can implement fallback logic when a best match isn't identified. For example, script selection rule policies may provide a client-side script reference to an en-BG instance of a script when an en-US instance of the script is not available.

Figure 4:
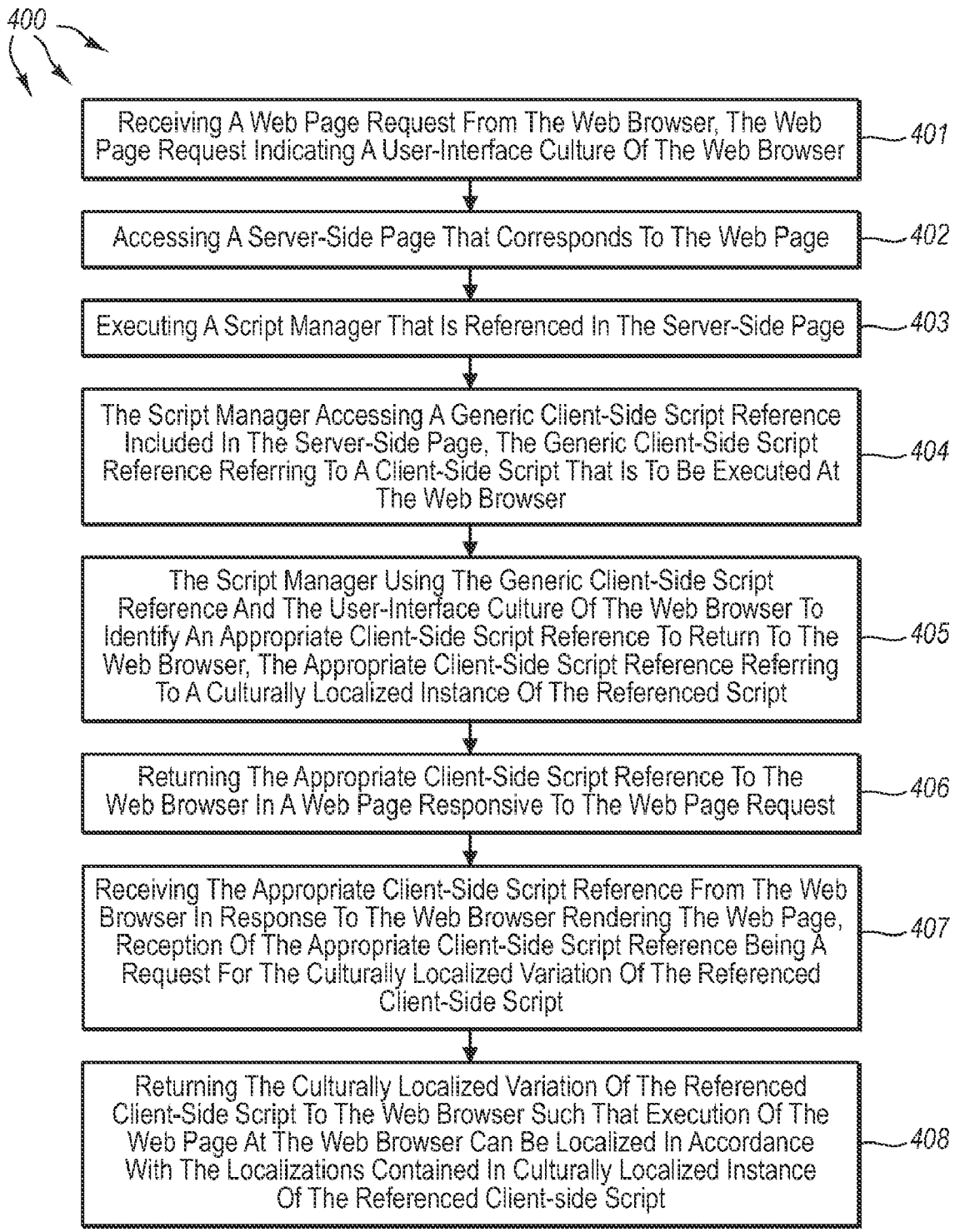
FIG. 4 illustrates a flow chart of another example method for providing localized resources for client-side script execution.

FIG. 4 illustrates a flow chart of another example method 400 for providing localized resources for client-side script execution. The method 400 will be described with respect to the components and data depicted in computer architecture 300.

Method 400 includes an act of receiving a Web page request from the Web browser, the Web page request indicating a user-interface culture of the Web browser (act 401). For example, Web server 306 can receive request 354 (e.g., an HTTP GET, POST, etc.), including culture indicator 356, from Web browser 304. Culture indicator 356 indicates the user-interface culture of Web browser 304. Method 400 includes an act of accessing a server side page that corresponds to the Web page (act 402). For example, Web server 306 can access page 321 (e.g., an ASP .Net page).

Method 400 includes an act of executing a script manager that is referenced in the server-side page (act 403). For example, Web server 306 can identify script manager reference 308R as a reference to a server-side script. In response, Web server 306 can transfer script reference manager reference 308R to script processor 307. Script processor 307 can use script manager reference 308R to locate script manager script 308S (e.g., stored somewhere at computer system 302). Script processor 307 executes script manager script 308S to load an instance of script manager 308.

Method 400 includes an act of the script manager accessing a generic client-side script reference included in the server-side page, the generic client-side script reference referring to a client-side script that is to be executed at the Web browser (act 404). For example, script manager 308 can access generic script reference 314R from page 321. Generic script reference 314R can refer to a client-side script that is to be executed at Web browser 304.

Method 400 includes an act of the script manager using the generic client-side script reference and the user-interface culture of the Web browser to identify an appropriate client-side script reference to return to the Web browser (act 405). The appropriate client-side script reference referring to a culturally localized instance of the referenced script. Script manager 308 can use generic script reference 314R to access assembly 312. Assembly 312 can include various different localized instances of a script. Script manager 308 can apply script localization rules 309 to the various different localized instances based on culture indicator 356 to identify an appropriate client-side script reference to return to Web browser 304.

For example, script manager 308 can identify localized script 314S2 as an appropriate script in run in the user-interface culture of Web browser 304. Thus, script manager 308 can identify localized script reference 314R2 (a reference localized script 314S2) as an appropriate client-side script reference to return to the Web browser 304.

In some embodiments, a generic script reference does not refer to an actual script. The generic script reference instead provides data to script manager 308 that can be used to identify an appropriate culturally localized instance of a script. For example, a generic script reference may be a reference to an assembly that contains the various different localized instances of a script and include a portion of the name of the script. Thus, generic script reference 314R can be a reference to assembly 312 and include a portion of a script name that is common to all of the various different localized instances of a script. For example, generic script reference 314R could be a reference to a script named "script.js". The generic script reference can then be used to identify any of the various different localized instances of the script, such as, for example, "script.en-US.js", "script.jp-JP.js" (Japanese in Japan), "script.fr-CA.js", etc.

Method 400 includes an act returning the appropriate client-side script reference to the Web browser (act 406). For example, Web server 306 can return Web page 356 to Web browser 304. Web page 356 can include content 357 (e.g., any content accessed and/or generated at Web server 106) along with localized script reference 314R2.

During rendering of Web page 356, Web browser 304 can encounter localized script reference 314R2. Web browser 304 can pass localized script reference 314R2 to script processor 317. Since the adapted script reference is included in a script tag, script processor 317 attempts to obtain a script from the location referenced by localized script reference 314R2. For example, script processor 317 can submit localized script reference 314R2 back to Web server 306.

Method 400 includes an act of receiving the appropriate client-side script reference from the Web browser in response to the Web browser rendering the Web page, reception of the appropriate client-side script reference being a request for the culturally localized variation of the referenced client-side script (act 407). For example, Web server 306 can receive localized script reference 314R2 from Web browser 304 in response to Web browser 304 rendering Web page 356. Reception of localized script reference 314R2 is a request for a referenced client-side script.

Method 400 includes an act of returning the culturally localized variation of the referenced client-side script to the Web browser (act 408). Accordingly, execution of the Web page at the Web browser can be localized in accordance with the localizations contained in culturally localized instance of the referenced client-side script. For example, Web server 306 can return localized script 314S2 to script processor 317. Accordingly, execution of Web page 356 can be localized in accordance with the localizations contained in localized script 314S2. For example, execution of script 314S1 can produce localized content 361.

Thus, embodiments of the invention facilitate providing culturally localized resources for executing client-side scripts at Web browser. A script manager and/or script handler at a Web server include logic for selecting appropriate localized resources or scripts to return to a Web browser. Accordingly, a Web page developer need not expressly reference multiple differently localized instances of a script in a Web page, potentially causing a Web browser to potentially download multiple instances of script many of which are not likely to be used.

In some embodiments, client-side script reference tags refer to a script handler at the Web server (instead of an actual script). The script handler can a return localized resource sets for use with client-side scripts (that include calls to external resources). Accordingly, execution of client-side scripts can be localized in accordance with resources contain in the localized resource set. In other embodiments, a script manager using a generic script reference to identifying an appropriate localized instance of a script. Client-side script reference tags refer to the appropriate localized instance of the script. Accordingly, execution of a Web page can be localized in accordance with the localizations contained in the localized instance of the script.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a Web server, the Web server including a script handler for providing client-side scripts and corresponding appropriately localized resources to a Web browser, a method for utilizing localized resources for client-side scripts, the method comprising:

an act of receiving a Web page request from the Web browser, the Web page request indicating a user-interface culture of the Web browser, the user-interface culture including at least a language used by the Web browser;

an act of accessing a server-side page that corresponds to the Web page;

an act of executing a script manager that is referenced in the server-side page;

an act of the script manager accessing a client-side script reference included in the server-side page, the client-side script reference referring to a client-side script that is to be executed at the Web browser, the client-side script including localization calls to external resources;

an act of the script manager formulating an adapted client-side script reference to return to the Web browser, the adapted client-side script reference referring to the script handler and including a query portion that identifies at least the referenced client-side script and the user-interface culture of the Web browser;

an act of returning the adapted client-side script reference to the Web browser in a Web page responsive to the Web page request;

subsequent to returning the adapted client-side script reference to the Web browser, an act of receiving the adapted client-side script reference from the Web browser in response to the Web browser rendering the Web page, reception of the adapted client-side script reference being a request for the referenced client-side script;

an act of dispatching the query portion of the adapted client-side script reference to the script handler;

an act of the script handler identifying an appropriately localized resource set to use along with the referenced client-side script at the Web server based at least in part on the user-interface culture of the Web browser;

an act of the script handler creating a resource set that can be used by the client-side script; and an act of returning the referenced client-side script along with the resource set to the Web browser in a single request such that execution of the client-side script at the Web browser can be localized in accordance with resources contained in the formatted localized resource set.

2. The method as recited in claim 1, wherein the act of receiving a Web page request from the Web browser comprises an act of receiving a HyperText Transfer Protocol GET message.

3. The method as recited in claim 1, wherein the act of accessing a server-side page that corresponds to the Web page comprises an act of accessing an ASP .NET page.

4. The method as recited in claim 1, wherein the act of the script manager formulating an adapted client-side script reference to return to the Web browser comprises an act of to script manager applying script localization rules to the client-side script reference based on the indicated user-interface culture to formulate the query portion of the adapted client-side script reference.

5. The method as recited in claim 1, wherein the act of the script manager formulating an adapted client-side script reference to return to the Web browser comprises an act of to script manager formulating a query portion that indicates a country and a language to be used for localization at the Web browser.

6. The method as recited in claim 1, wherein the script handler identifying an appropriately localized resource set comprises an act of identifying a localized resource set based on a language and a country indicated in the query portion.

7. The method as recited in claim 1, wherein the script handler identifying an appropriately localized resource set comprises invoking fallback logic when a best match to the indicated user-interface culture of the Web browser is not available.

8. The method as recited in claim 1, wherein the act of script handler a resource set that can be used by the client-side script comprises an act of formatting the localized resource set into a .resx file.

9. The method as recited in claim 1, further comprising:
an act of receiving a second Web page request for a second Web page from a second Web browser, the second Web page request indicating a user-interface culture of the second Web browser, the user-interface culture including at least a language used by the second Web browser;
an act of accessing a second server-side page that corresponds to the second Web page;
an act of executing a second script manager that is included in the second server-side page;
an act of the second script manager accessing a generic client-side script reference included in the second server-side page, the generic client-side script reference referring to a second client-side script that is to be executed at the second Web browser;
an act of the second script manager using the generic client-side script reference and the user-interface culture of the second Web browser to identify an appropriate client-side script reference to return to the second Web browser, the appropriate client-side script reference referring to a culturally localized instance of the referenced script;
an act of returning the appropriate client-side script reference to the second Web browser;
an act of receiving the appropriate client-side script reference from the second Web browser in response to the second Web browser rendering the second Web page, reception of the appropriate client-side script reference being a request for the culturally localized instance of the second client-side script; and
an act of returning the culturally localized instance of the second client-side script to the second Web browser such that execution of the second Web page at the second Web browser can be localized in accordance with the localizations contained in culturally localized instance of the second client-side script.

10. The method as recited in claim 9, wherein the act of receiving a second Web page request for a second Web page from the second Web browser comprises an act of receiving a HyperText Transfer Protocol GET message.

11. The method as recited in claim 9, wherein the act of the second script manager using the generic client-side script reference and the user-interface culture of the second Web browser to identify an appropriate client-side script reference comprises an act the second script manager enumerating different localized versions of the second client-side script referenced by the generic client-side script reference.

12. The method as recited in claim 9, wherein the act of the second script manager using the generic client-side script reference and the user-interface culture of the second Web browser to identify an appropriate client-side script reference comprises act of using an indicated language and indicated country to identify an appropriate client-side script reference.

13. The method as recited in claim 9, wherein the act of the second script manager using the generic client-side script reference and the user-interface culture of the second Web browser to identify an appropriate client-side script reference comprises act of using the generic client-side script reference that references an assembly including differently localized instances of the second client-side script and includes a common portion of the name of each of the instances of the second client-side script.

14. The method as recited in claim 13, wherein references for the differently localized instances of the second client-side script are differentiated by language codes and country codes included in the names of the differently localized instances of the second client-side script.

15. A computer program product for use at a Web server, the Web server include a script handler for providing client-side scripts and corresponding appropriately localized resources to a Web browser, the computer program product for implementing a method for utilizing localized resources for client-side scripts, the computer program product comprising one or more computer-readable storage media having stored thereon computer-executable instructions that, when executed at a processor, cause the Web server to perform the method, including the following:
receive a Web page request from the Web browser, the Web page request indicating a user-interface culture of the Web browser, the user-interface culture including at least a language used by the Web browser;
access a server-side page that corresponds to the Web page;
execute a script manager that is referenced in the server-side page;
access a client-side script reference included in the server-side page, the client-side script reference referring to a client-side script that is to be executed at the Web browser, the client-side script including localization calls to external resources;
formulate an adapted client-side script reference to return to the Web browser, the adapted client-side script reference referring to the script handler and including a query portion that identifies at least the referenced client-side script and the user-interface culture of the Web browser;
return the adapted client-side script reference to the Web browser in a Web page responsive to the Web page request;
receive the adapted client-side script reference from the Web browser in response to the Web browser rendering the Web page, reception of the adapted client-side script reference being a request for the referenced client-side script;
dispatch the query portion of the adapted client-side script reference to the script handler;
identify an appropriately localized resource set to use along with the referenced client-side script at the Web server based at least in part on the user-interface culture of the Web browser;
create a resource set that can be used by the client-side script; and
return the referenced client-side script along with the resource set to the Web browser in a single request such that execution of the client-side script at the Web browser can be localized in accordance with resources contained in the resource set.

16. The computer program product as recited in claim 15, wherein computer-executable instructions that, when executed, cause the Web server to formulate an adapted client-side script reference to return to the Web browser comprise computer-executable instructions that, when executed, cause the Web server to apply script localization rules to the client-side script reference based on the indicated user-interface culture to formulate the query portion of the adapted client-side script reference.

17. The computer program product as recited in claim 15, wherein computer-executable instructions that, when executed, cause the Web server to formulate an adapted client-side script reference to return to the Web browser comprise computer-executable instructions that, when executed, cause the Web server to formulate a query portion that indicates a country and a language to be used for localization at the Web browser.

18. The computer program product as recited in claim 15, wherein computer-executable instructions that, when executed, cause the Web server to formulate an adapted client-side script reference to return to identify an appropriately localized resource set comprise computer-executable instructions that, when executed, cause the Web server to identify a localized resource set based on a language and a country indicated in the query portion.

19. The computer program product as recited in claim 15, wherein computer-executable instructions that, when executed, cause the Web server to formulate an adapted client-side script reference to return to identify an appropriately localized resource set comprise computer-executable instructions that, when executed, cause the Web server to invoke fallback logic when a best match to the indicated user-interface culture of the Web browser is not available.

\* \* \* \* \*